United States Patent [19]

Lorimor et al.

[11] Patent Number: 4,771,864
[45] Date of Patent: Sep. 20, 1988

[54] LUBRICATED SPLINE JOINT

[75] Inventors: Larry W. Lorimor, Peoria; Dwight V. Stone, East Peoria; Ronald E. Tomevi, Pekin, all of Ill.

[73] Assignee: Caterpillar Inc., Peoria, Ill.

[21] Appl. No.: 94,566

[22] Filed: Sep. 9, 1987

[51] Int. Cl.$^4$ .............................................. F01M 9/00
[52] U.S. Cl. ..................................... 184/6; 184/6.12; 403/37; 403/359; 464/16
[58] Field of Search ..................... 184/6, 6.12; 403/37, 403/339; 74/467; 464/7, 16

[56] References Cited

U.S. PATENT DOCUMENTS

| | | | |
|---|---|---|---|
| 1,616,034 | 2/1927 | Fast | 464/16 |
| 3,242,695 | 3/1966 | Ross, Jr. | 464/16 |
| 3,301,349 | 1/1967 | Williams | 184/11.1 |
| 3,365,913 | 1/1968 | Shields | 184/6 |
| 3,380,555 | 4/1968 | Myers et al. | 184/6.12 |
| 3,589,471 | 6/1971 | Edge | 184/6 |
| 3,621,937 | 11/1971 | Edge et al. | 184/6.11 |
| 3,991,855 | 11/1976 | Heintzelman | 184/6 |
| 4,281,942 | 8/1981 | Gaeckle et al. | 403/38 |
| 4,572,682 | 2/1986 | Iwata | 403/37 |

OTHER PUBLICATIONS

Exhibit A–Sketch of Lubricated Spline Joint Used on a Caterpillar Inc. Model 785 Truck, circa Aug. 1983.

*Primary Examiner*—Leonard E. Smith
*Attorney, Agent, or Firm*—Charles E. Lanchantin, Jr.

[57] ABSTRACT

A lubricating spline joint for providing a viscous damping function includes a first member defining an internal spline, a second member defining an external spline engaged therewith, a seal ring between the members at one end of the splines, and a radially inwardly facing chamber at the other end which is exposed to lubrication fluid. The improvement features an internal barrier for assuring a fixed internal radius R and thus a preselected centrifugal pressure head of the fluid mass in the chamber and about the splines, and a plurality of venting passages located radially outwardly of the radius R for continually exhausting fluid from the splines as a result of centrifugal force so that fresh and/or less aerated fluid is circulated through the splines.

14 Claims, 2 Drawing Sheets

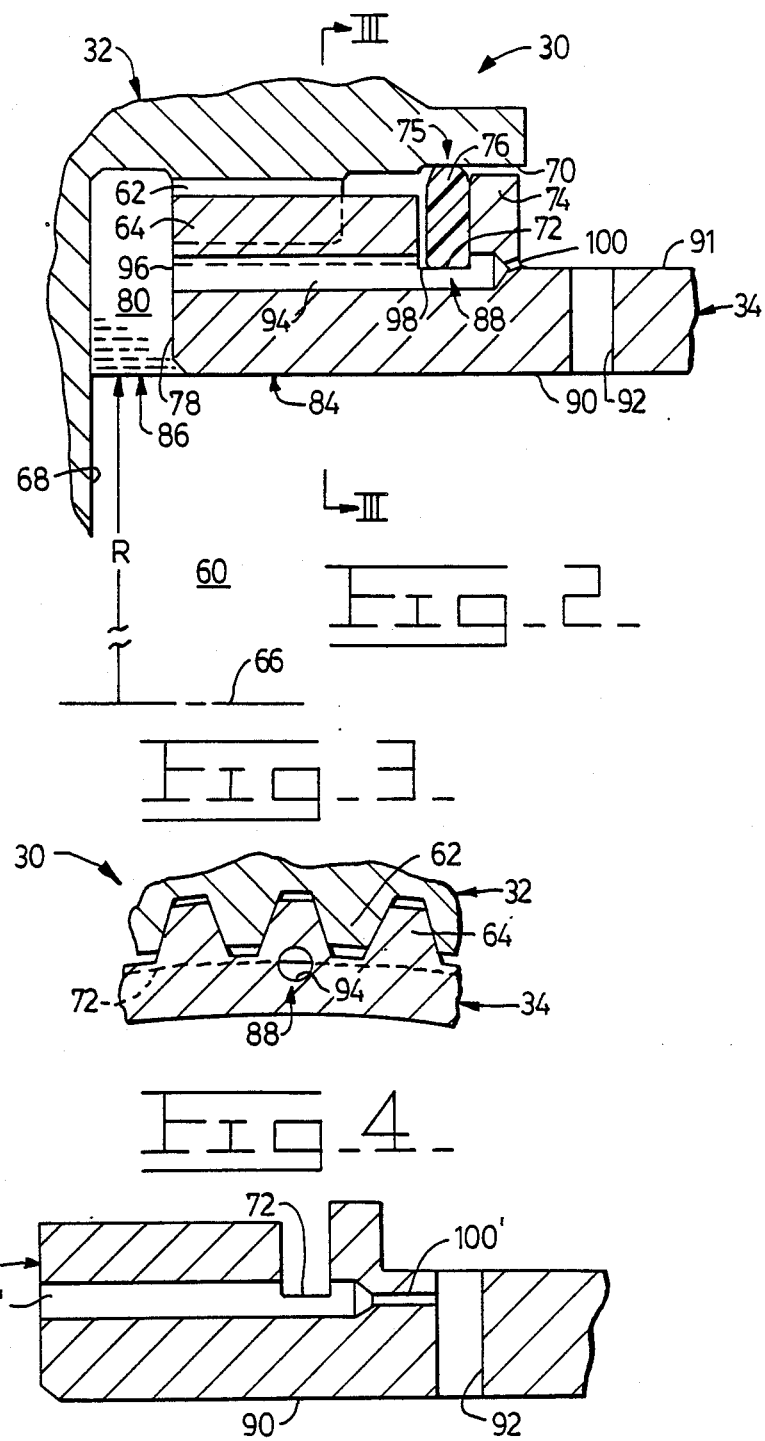

LUBRICATED SPLINE JOINT

DESCRIPTION

1. Technical Field

This invention relates to a spline joint for connecting two rotatable members, and more particularly to a spline joint that has a controlled annular lubricating fluid mass associated therewith.

2. Background Art

The fretting and progressive wear of spline joint teeth has long been a problem, and it has become a recognized requirement to provide adequate lubrication thereto. It has also been found that merely allowing a lubricating fluid to pass over the splines is inadequate because at higher rotational speeds and loads the lubricating fluid is thrown outwardly so fast that the spline teeth surfaces still experience such phenomenon.

In order to improve the service life of spline joints lubricating fluid has been supplied thereto in the form of an annular mass, with the inside effective diameter of the spinning mass often being limited by an annular dam adjacent one end of the spline joint. Exemplifying the art in this area are the following U.S. Pat. Nos.: 3,242,695 issued Mar. 29, 1966 to P. M. Ross, Jr; 3,301,349 issued Jan. 31, 1967 to J. W. Williams; 3,380,555 issued Apr. 30, 1968 to J. D. Myers, et al; 3,589,471 issued June 29, 1971 to R. G. Edge; 3,621,937 issued Nov. 23, 1971 to R. G. Edge, et al; and 4,281,942 issued Aug. 4, 1981 to F. J. Gaeckle, et al.

A variation of the aforementioned prior art is used commercially to connect an engine-driven flywheel member and the rotating housing input member of a hydrodynamic torque converter. A seal ring forms a dam at one end of the spline joint, and a radially inwardly facing chamber that is accessible to lubricating fluid is located at the other end thereof. A plurality of relatively large diameter passages are formed longitudinally in the radially inner housing member which are in open communication with the chamber and the seal ring groove at the opposite ends of the spline joint, and also with a radially outwardly opening surface for the continual egress of fluid from the region of the spline joint. In such variation there is no attempt to accurately control the rate of flow of fluid egress through the passages, and the centrifugal pressure head is limited to substantially the inside radius of the seal ring and/or the radially outer portion of each passage.

One spline joint located between a flywheel member and a torque converter housing member driven thereby was observed to have substantial dynamic activity. Particularly, the internal and external teeth of the spline joint actually backed away from the normal direction of engagement and then reengaged in a pulsating manner during certain portions of the operating speed range of the system. In order to dynamically dampen this high speed cyclic activity, the spline joint was submerged in an annular mass of lubricating fluid to a radial depth sufficient to provide a greater centrifugal pressure head than that required for simply lubricating the spline joint. In such instance an internal dam provided a fixed minimum internal radius of the fluid mass around the spline, and there was no attempt to circulate fluid through the splines. However, experimental test results were unsatisfactory at the desired intermediate internal radius value of the fluid mass.

In high speed applications the centrifugal action on the lubricating fluid mass can cause separating forces parallel to the axis of rotation of a significant magnitude upon the flywheel member and the housing member, and these forces are imposed on the bearings that support them. Consequently, it is desired that the radial depth of the fluid mass and/or the internal effective radius thereof be limited to minimize such forces.

Accordingly, what is needed is a lubricated spline joint of relatively simple and economical construction that can effectively and controllably provide viscous damping of the cyclically induced torsional vibrations of the system as well as reducing wear of the splines. The spline joint should provide the desired centrifugal pressure head while not exceeding a preselected maximum pressure head range in order to minimize thrust loads upon the bearings, and should continually and controllably circulate fresh lubricating fluid through the splines to minimize aeration and/or cavitation problems and to aid in self-cleaning so that deleterious material does not collect over a substantial period of time in relatively dead-end pockets.

DISCLOSURE OF THE INVENTION

The present invention is directed to overcoming one or more of the above problems.

In one aspect of the present invention there is provided a lubricated spline joint for connecting first and second members rotatable about a central axis and individually defining an internal spline and an external spline respectively. Sealing means is disposed near one end of the splines, a radially inwardly facing annular chamber is disposed near the other end thereof, and a source of lubricating fluid is accessible to the chamber. Advantageously, first means is provided for establishing a preselected minimum internal radius R of an annular fluid mass submerging the splines to limit the centrifugal pressure head thereof, and second means is provided for controllably venting the fluid mass at a location radially outwardly of the radius R so that only a portion of the available supply of lubricating fluid is continually dispelled as a result of centrifugal force and fresh replacement fluid is circulated through the splines.

Preferably, the first means is defined within the second member by an internal cylindrical surface that essentially forms a dam of the preselected radius R, and by a cooperating plurality of radially oriented passages that centrifugally exhaust fluid away from the cylindrical surface. The second means is independent of the first means and includes a plurality of passages formed in the internal second member radially outwardly of the radius R so that fluid is controllably exhausted in a generally longitudinal direction away from the chamber and the splines. By controlling the rate of fluid egress from the fluid mass relatively clean and/or nonaerated fluid is caused to continually and more evenly be distributed over the submerged splines. This markedly improves the viscous damping characteristics of the joint, reduces wear, and maintains the axial thrust forces as a result of the centrifugal pressure head at acceptable levels.

BRIEF DESCRIPTION OF THE DRAWINGS

FIG. 2 is an enlarged fragmentary, longitudinal, cross sectional view of the spline joint illustrated in FIG. 1 showing details of the fluid passages formed in the members thereof;

Figure 1:
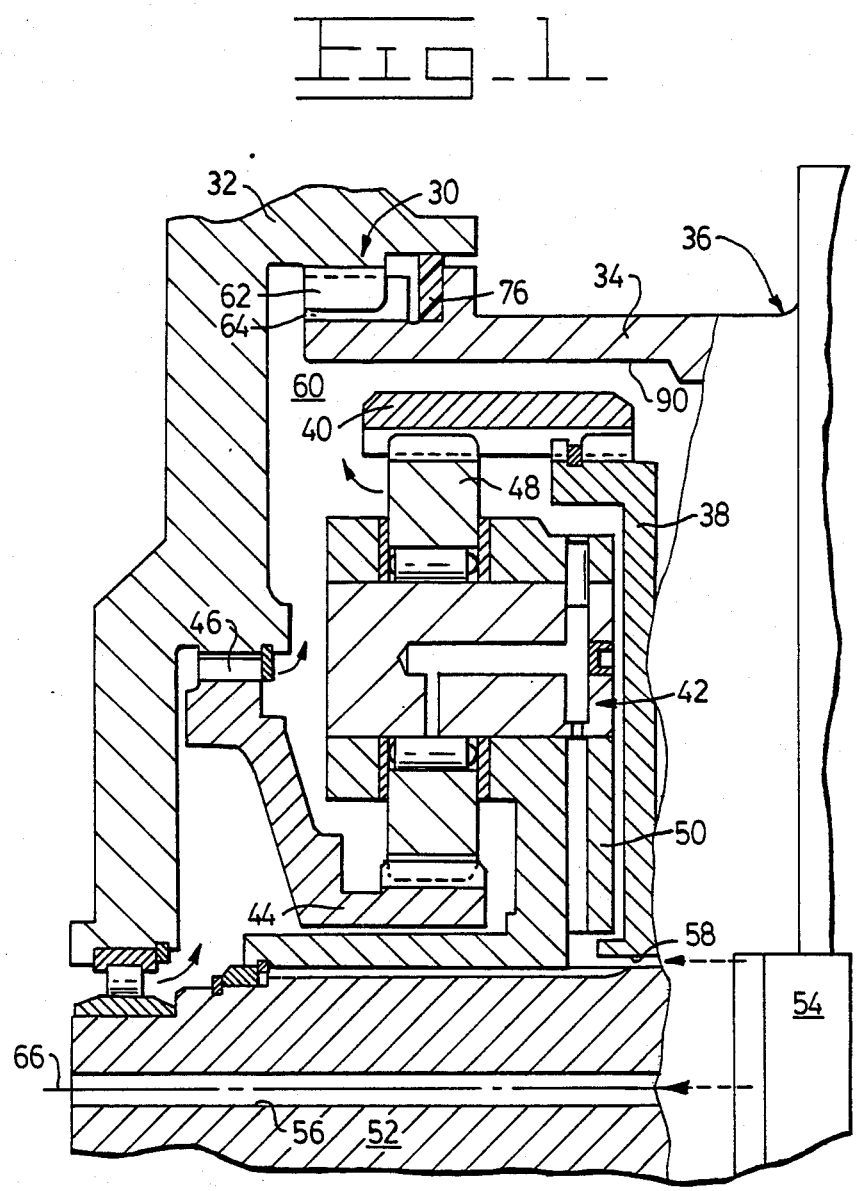
FIG. 1 is a fragmentary, longitudinal, cross sectional view taken through the central axis of a lubricated spline joint constructed in accordance with the present invention and in the environment of an engine-driven flywheel and a torque converter driven thereby.

FIG. 3 is a transverse cross sectional view taken along the line III—III of FIG. 2; and FIG. 4 is an enlarged, fragmentary, longitudinal cross sectional view of an alternate embodiment housing member that can be used in place of the housing member shown in FIG. 2 to form a lubricated spline joint constructed in accordance with the present invention.

BEST MODE FOR CARRYING OUT THE INVENTION

Referring to FIG. 1, a lubricated spline joint 30 constructed in accordance with the present invention is shown in the exemplary environment of an engine-driven flywheel member 32 and a driven tubular housing member 34 of a conventional hydrodynamic torque converter 36, only a portion of which is illustrated. The torque converter is driven by the housing member 34 and has an output element 38 drivingly connected to an internally toothed ring gear 40 of a planetary gear set 42. The planetary gear set includes a sun gear 44 which is releasably connected to the flywheel member 32 by a spline joint 46, and a plurality of planet gears 48, one of which is shown, are intermeshingly engaged with the ring gear and the sun gear. The planet gears are rotatably supported in a planet carrier 50 which is connected to rotate with an output shaft 52. The planetary gear set forms a mechanical torque divider that is of interest primarily only to indicate that a source 54 of pressurized lubricating fluid is effective to communicate the fluid to a central passage 56 defined in the output shaft 52, and to a passage 58 defined between the output shaft and the converter output element 38. Thus, a fluid such as oil is directed to the elements of the planetary gear set for the lubrication thereof and is available in generous amounts in a chamber 60 defined within the flywheel member 32 and the housing member 34.

As shown best in FIGS. 2 and 3, the first flywheel member 32 of the spline joint 30 defines an internal spline 62, and the second housing member 34 defines an external spline 64 which is intermeshingly engaged with the internal spline. These splines are generally concentrically arranged with respect to a longitudinally oriented central axis 66. The flywheel member 32 further defines an annular side wall 68 normal to the central axis adjacent one end of the spline joint, and an internal cylindrical surface 70 adjacent the other end thereof.

An annular groove 72 is defined in the housing member 34 between the external spline and a back-up flange 74, and sealing means 75 is provided at one end of the splines for preventing flow between the members 32 and 34 which can experience relative motion therebetween. The sealing means includes a seal ring 76 seated in the groove and which makes effective sealing contact with the cylindrical surface 70 of the flywheel member 32. Preferably, the seal ring is made of a polymeric or elastomeric material which is adaptable to swell in the presence of a lubricating fluid such as oil. For example, one seal ring material that is preferred is of Viton synthetic rubber material. Viton is a recognized tradename of E.I. duPont de Nemours & Co. Inc.

The housing member 34 also defines an end wall 78 which faces the side wall 68, and defines therewith and with the flywheel member 32 a radially inwardly facing annular chamber 80. This chamber is supplied with lubricating fluid by the centrifugal action of the rotating members.

In accordance with the present invention, the spline joint 30 includes first means or an internal annular barrier as is indicated generally by the reference number 84 for establishing a preselected minimum internal radius R from the central axis 66 of an annular fluid mass 86 entrapped around and submerging the splines 62 and 64. The annular barrier 84 thereby limits the maximum centrifugal pressure head to a preselected range of values corresponding to the speed of rotation of the spline joint. And significantly, the spline joint further includes second means or an exhaust device 88 for controllably venting the fluid mass radially outwardly of the radius R so that a portion thereof is continually dispelled outwardly as a result of centrifugal force and replacement lubricating fluid can circulate through the spline joint 30.

More specifically, the internal annular barrier 84 includes an internal cylindrical surface 90 formed within the housing member 34 which essentially defines the internal radius R from the central axis 66 as is shown in FIG. 2. A plurality of radially oriented passages 92 are also defined fully through the housing member which communicate with the surface 90 and an external peripheral surface 91 of the housing member to limit the amount of lubricating fluid collected on the internal surface 90 to a substantially fixed value.

As shown in FIGS. 2 and 3, the spline joint exhaust device 88 includes a plurality of generally longitudinally oriented venting passages 94 that are defined in the housing member and individually spaced within one tooth of the external spline 64. Each of the venting passages has a first inlet 96 at one end of the spline joint 30 communicating with the chamber 80, and a second inlet 98 in open communication with the seal ring groove 72 between the opposite end of the spline joint and the seal ring 76. Also, a flow-restricting orifice 100 is defined in each of the venting passages which are in open communication with the external peripheral surfact 91 in order to controllably limit the amount of fluid being discharged. These orifices are sized so that the fluid discharge rate is less than the incoming supply so that a full torus of fluid or annular fluid mass is available.

First Alternate Embodiment

FIG. 4 illustrates a first alternate embodiment of the lubricated spline joint 30, wherein only the housing member 34' is illustrated as being modified from the housing member 34 of FIG. 2. Particularly, the orifices 100' of the venting passages 94' have been drilled in a longitudinal direction parallel to the central axis such that they intersect and are in open communication with the radial passages 92. From a manufacturing standpoint this is less costly than to drill the orifices 100 at the inclined 45° angle shown in FIG. 2.

Industrial Applicability

In operation, the engine-driven flywheel member 32 was rotated through an operating range of from about 700 to 2000 rpm. Tests indicated that when the venting passages 94 were not included, and when only the internal annular barrier 84 and the radial passages 92 were used that the fluid damping characteristics of the spline joint were not satisfactory. However, when the spline joint 30 illustrated in FIGS. 2 and 3 was tested, it was found that very desirable fluid damping was achieved. It was theorized that the venting passages 94 are extremely beneficial by continually purging lubricating fluid and entrapped air from the region of the spline joint. By continually having inlet access to both ends of the spline joint any aerated fluid thereat is caused to continuously flow along the venting passages and out the flow limiting orifices 100. The location of the venting passages at substantially the radially inner portion of the spline joint is beneficial in that proportionately more air or cavitation is present thereat than at the radially outer portion due to centrifugal forces. The flow limiting orifices assure that the fluid mass 86 will build up in the chamber 80 to the radius R and have a sufficient pressure head to provide significant viscous damping characteristics.

In view of the foregoing, it is apparent that the economical lubricated spline joint 30 of the present invention not only includes first means 84 that assures an adequately sized annular fluid mass 86 to provide the desired centrifugal pressure head range, but also includes second means 88 independent of the first means for continually purging lubricating fluid from the splines 62 and 64 at a location spaced radially outwardly of the inner radius of the fluid mass so that relatively fresh and less aerated fluid is available to effect the desired degree of viscous damping of the splines. Thus, lubricating fluid having the desired characteristics is available at a particularly effective range of pressures to more uniformly coat the individual spline teeth, and yet the thrust loads produced by the rotating fluid mass are also maintained within practical limits.

Other aspects, objects and advantages of this invention can be obtained from a study of the drawings, the disclosure and the appended claims.

We claim:

1. A lubricated spline joint for connecting first and second members rotatable about a central axis, the first member defining an internal spline, the second member defining an external spline engaged with the internal spline and being accesible to a source of lubricating fluid, comprising:
   sealing means for preventing fluid egress between the members at one end of the splines;
   a radially inwardly facing annular chamber located at the other end of the splines and communicating with the fluid source;
   first means for establishing a preselected minimum internal radius R of an annular fluid mass submerging the splines and limiting the maximum centrifugal pressure head thereof to a preselected range of values corresponding to the speed of rotation of the splines; and
   second means for controllably venting the fluid mass at a discharge rate less than the available supply of lubricating fluid to the annular chamber and at a location radially outwardly of the radius R so that only a portion of the flow rate to this chamber is continually dispelled radially outwardly as a result of centrifugal force and fresh replacement fluid is circulated through the splines.

2. The spline joint of claim 1 wherein the second means includes a plurality of venting passages having a first inlet at one end of the splines and a second inlet at the other end thereof, the first and second inlets being located adjacent the radially inner portions of the splines.

3. The spline joint of claim 1 wherein the second means includes a plurality of generally longitudinally oriented venting passages defined in the second member, and each of the venting passages has a flow limiting orifice at the outlet thereof.

4. The spline joint of claim 3 wherein the first means includes a cylindrical surface defined by the second member and a plurality of radially oriented passages opening on the cylindrical surface.

5. The spline joint of claim 4 wherein each of the flow-limiting orifices is in open communication with one of the radially oriented passages.

6. The spline joint of claim 1 wherein the second member has an external peripheral surface and the second means includes a plurality of venting pasages in the second member which open radially outwardly on the external peripheral surface.

7. The spline joint of claim 6 wherein each of the venting passages has a flow-restricting orifice that opens outwardly on the external peripherial surface.

8. The spline joint of claim 7 wherein the first means includes an internal cylindrical surface defined by the second member and establishing the minimum internal radius R.

9. A lubricated spline joint for connecting a first member defining an internal spline and a second member defining an external spline, comprising:
   a seal ring located at one end of the engaged splines and sealingly connected to the first and second members;
   a radially inwardly opening annular chamber located at the other end of the splines and communicating therewith;
   a source of lubricating fluid communicating with the chamber at a preselected flow rate;
   an internal annular barrier for establishing a fixed internal radius R of a fluid mass in the chamber and submerging the splines; and
   an exhaust device for controllably venting the fluid mass from the annular chamber at a discharge rate less than the preselected flow rate as a result of centrifugal force at a location radially outwardly of the radius R and for assuring that replacement fluid is continually circulated through the splines.

10. The spline joint of claim 9 wherein the exhaust device includes a plurality of venting passages in the second member and individually having a first inlet at one end of the splines and a second inlet at the other end thereof.

11. The spline joint of claim 10 wherein the first and second inlets are located adjacent the radially inner portion of the splines to better purge aerated lubricating fluid therefrom.

12. The spline joint of claim 10 wherein each of the venting passages has a flow-limiting orifice associated therewith.

13. The spline joint of claim 10 wherein the barrier includes an internal cylindrical surface within the second member and forming a dam for the fluid mass in the chamber.

14. The spline joint of claim 10 wherein the barrier includes a plurality of radial passages through the second member in communication with the cylindrical surface.

* * * * *